US007646277B2

(12) United States Patent
Tsunenaga et al.

(10) Patent No.: US 7,646,277 B2
(45) Date of Patent: Jan. 12, 2010

(54) IGNITION COIL

(75) Inventors: Kouji Tsunenaga, Chiryu (JP); Kiyotoshi Nakamoto, Kariya (JP)

(73) Assignee: Denso Corporation, Kariya (JP)

(*) Notice: Subject to any disclaimer, the term of this patent is extended or adjusted under 35 U.S.C. 154(b) by 25 days.

(21) Appl. No.: 12/122,836

(22) Filed: May 19, 2008

(65) Prior Publication Data

US 2009/0002113 A1 Jan. 1, 2009

(30) Foreign Application Priority Data

Jun. 29, 2007 (JP) ............................ 2007-172899

(51) Int. Cl.

| | |
|---|---|
| ***H01F 27/02*** | (2006.01) |
| ***H01F 27/08*** | (2006.01) |
| ***H01F 21/06*** | (2006.01) |
| ***H01F 27/30*** | (2006.01) |
| ***H01F 27/24*** | (2006.01) |
| ***H01F 38/12*** | (2006.01) |
| ***H02P 3/02*** | (2006.01) |

(52) U.S. Cl. ............................ 336/90; 336/59; 336/60; 336/131; 336/198; 336/212; 123/634; 123/635

(58) Field of Classification Search ....................... None
See application file for complete search history.

(56) References Cited

U.S. PATENT DOCUMENTS

| | | | | |
|---|---|---|---|---|
| 5,771,870 | A * | 6/1998 | Satou et al. | 123/635 |
| 5,944,002 | A * | 8/1999 | Tracy et al. | 123/635 |
| 6,023,215 | A * | 2/2000 | Sakamaki et al. | 336/96 |
| 6,094,121 | A * | 7/2000 | Sakamaki et al. | 336/96 |
| 6,227,186 | B1 * | 5/2001 | Seidl et al. | 123/634 |
| 2005/0242914 | A1 * | 11/2005 | Kawai et al. | 336/90 |
| 2006/0061446 | A1 * | 3/2006 | Kato et al. | 336/90 |
| 2007/0182518 | A1 * | 8/2007 | Keller | 336/107 |
| 2008/0029074 | A1 * | 2/2008 | Anzo et al. | 123/634 |
| 2008/0264396 | A1 * | 10/2008 | Matsubayashi et al. | 123/634 |

FOREIGN PATENT DOCUMENTS

| | | |
|---|---|---|
| JP | 6-52123 | 7/1994 |
| JP | 2006-179824 | 7/2006 |

* cited by examiner

*Primary Examiner*—Anh T Mai
*Assistant Examiner*—Mangtin Lian
(74) *Attorney, Agent, or Firm*—Nixon & Vanderhye, PC

(57) ABSTRACT

An ignition coil includes a coil part having primary and secondary coils, a center core, and a peripheral core, a connector case part, a seal rubber, and a ventilation passage. The coil part is inserted in a plug hole of an engine, and the case part is outside the plug hole. An axial end of the peripheral core is inserted in an insertion hole of the case part. The peripheral core and an inner wall surface of the insertion hole define a ventilation clearance therebetween. A gap between the case part and the plug hole is sealed with the rubber. The rubber is closely-attached to the plug hole and the case part along its whole circumference. The passage, through which the plug hole is ventilated, includes the clearance and a ventilation hole formed at a certain position of the case part away from the rubber to communicate with the clearance.

5 Claims, 3 Drawing Sheets

IGNITION COIL

CROSS REFERENCE TO RELATED APPLICATION

This application is based on and incorporates herein by reference Japanese Patent Application No. 2007-172899 filed on Jun. 29, 2007.

BACKGROUND OF THE INVENTION

1. Field of the Invention

The present invention relates to an ignition coil used for generating a spark between a pair of electrodes in a spark plug in an engine.

2. Description of Related Art

In an engine in which gasoline, for example, is combusted, an ignition coil is attached to a spark plug that is arranged in a combustion chamber of each cylinder in a cylinder head. A spark is generated by the ignition coil between a pair of electrodes in the spark plug, and a fuel/air mixture of gas and air introduced into the combustion chamber is ignited. In a case where a coil part of the ignition coil is inserted in a plug hole of the engine, ozone gas caused due to high voltage, and the like, are generated in the plug hole. Accordingly, in order to ventilate the ozone gas in the plug hole using outside air that is outside the plug hole, a ventilation passage is formed in the ignition coil.

In the engine, pressure in the plug hole has a negative pressure when gas in the plug hole is cooled in a process, in which the engine is cooled from a state in which the engine is warmed up. Meanwhile, when the ignition coil is exposed to water, the water may enter into the plug hole through the ventilation passage Consequently, in order to prevent the water from entering into the plug hole, the formation of the ventilation passage is devised in a seal rubber or the like, which is disposed between the ignition coil and an opening of the plug hole.

There is an ignition coil for an internal combustion engines disclosed in JP9-158820A corresponding to U.S. Pat. No. 5,771,870, as an example of the ignition coil (ignition system) in which the formation of the ventilation passage is devised. The above ignition coil is used with its cylindrical portion inserted into a plug hole formed in the engine and attached to a spark plug disposed in the plug hole, and with its head region disposed outside the plug hole. An annular sealing member (seal rubber) for sealing an upper part of the plug hole is arranged between the head portion and an engine head cover. An axial direction passage, through which the inside of the plug hole communicates with the outside, is formed in the head portion and the sealing member. Furthermore, a radial direction groove is formed to communicate with the axial direction passage, and the radial direction groove is covered with a cap, whereby water accumulated on the engine head cover is prevented from entering into the plug hole. Additionally, in an ignition coil disclosed in JP2006-179824A, a cylindrical portion (coil part) equipped with a primary coil and a secondary coil is inserted in an insertion retention opening of its connector case part through a cylindrical insertion component.

However, in the ignition coil in which the coil part is inserted in the connector case part, further devices are needed to prevent more effectively water or the like from entering into the plug hole using a simple structure.

SUMMARY OF THE INVENTION

The present invention addresses the above disadvantages. Thus, it is an objective of the present invention to provide an ignition coil having a ventilation passage that effectively prevents water or the like from entering into the coil using a simple structure.

To achieve the objective of the present invention, there is provided an ignition coil inserted in a plug hole of an engine. The ignition coil includes a coil part, a connector case part, an annular seal rubber, and a ventilation passage. The coil part includes a primary coil, a secondary coil, a soft magnetic center core, and a soft magnetic peripheral core. The primary coil and the secondary coil are disposed in layers generally coaxially with each other. The center core is disposed on an inner circumferential side of the primary coil and the secondary coil. The peripheral core is disposed on an outer circumferential side of the primary coil and the secondary coil. The connector case part is made of resin and has a connector area, to which an electric wiring is connected. The coil part is inserted in the plug hole of the engine, and the connector case part is disposed outside the plug hole. An axial end portion of the peripheral core of the coil part is inserted in an insertion hole of the connector case part. The peripheral core and an inner wall surface of the insertion hole define a ventilation clearance therebetween. The annular seal rubber is attached to an outer circumference of the connector case part. A gap between the connector case part and the plug hole is sealed with the seal rubber. The seal rubber is closely-attached to the plug hole and the connector case part along a whole circumference of the seal rubber around a central axis of the coil part. The ventilation passage includes the ventilation clearance and a ventilation hole that is formed at a certain position of the connector case part away from the seal rubber to communicate with the ventilation clearance. The plug hole is ventilated through the ventilation passage.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the invention is described below. In the invention, a projection that is in contact with an outer circumferential surface of a peripheral core is formed at two or more positions in a circumferential direction of the connector case part on an inner wall surface of an insertion hole of a connector case part. A ventilation clearance may be formed preferably between the inner wall surface of the insertion hole and the outer circumferential surfaces of the peripheral core. In such a case, the ventilation clearances are formed as evenly as possible in the circumferential direction to have as large passage cross-sectional areas as possible in the circumferential direction, using a clearance formed between the projections. Also, the outer circumferential surface of the peripheral core slides on surfaces of the projections, and thereby the peripheral core of a coil part is smoothly inserted into the insertion hole.

The peripheral core has a notch formed over an overall length of the core in its axial direction. The ventilation clearance may be formed between the inner wall surface of the insertion hole and the notch of the peripheral core. In the above case, the ventilation clearance is formed easily using a shape of the peripheral core.

A ventilation hole may preferably open to the outside on a projection portion projecting from the side surface of the connector case part. In such a case, it is difficult for water or the like existing outside a plug hole to enter into the ventilation hole because of the formation of the projection portion.

A case flange part projecting radially outward is formed along the whole circumference of the connector case part around an axis line of a coil part. The case flange part may preferably be closely-attached along its whole circumference on a rubber flanged portion projecting radially outward along the whole circumference of a seal rubber. In the above case, water or the like is even more effectively prevented from entering into the plug hole.

Figure 1:
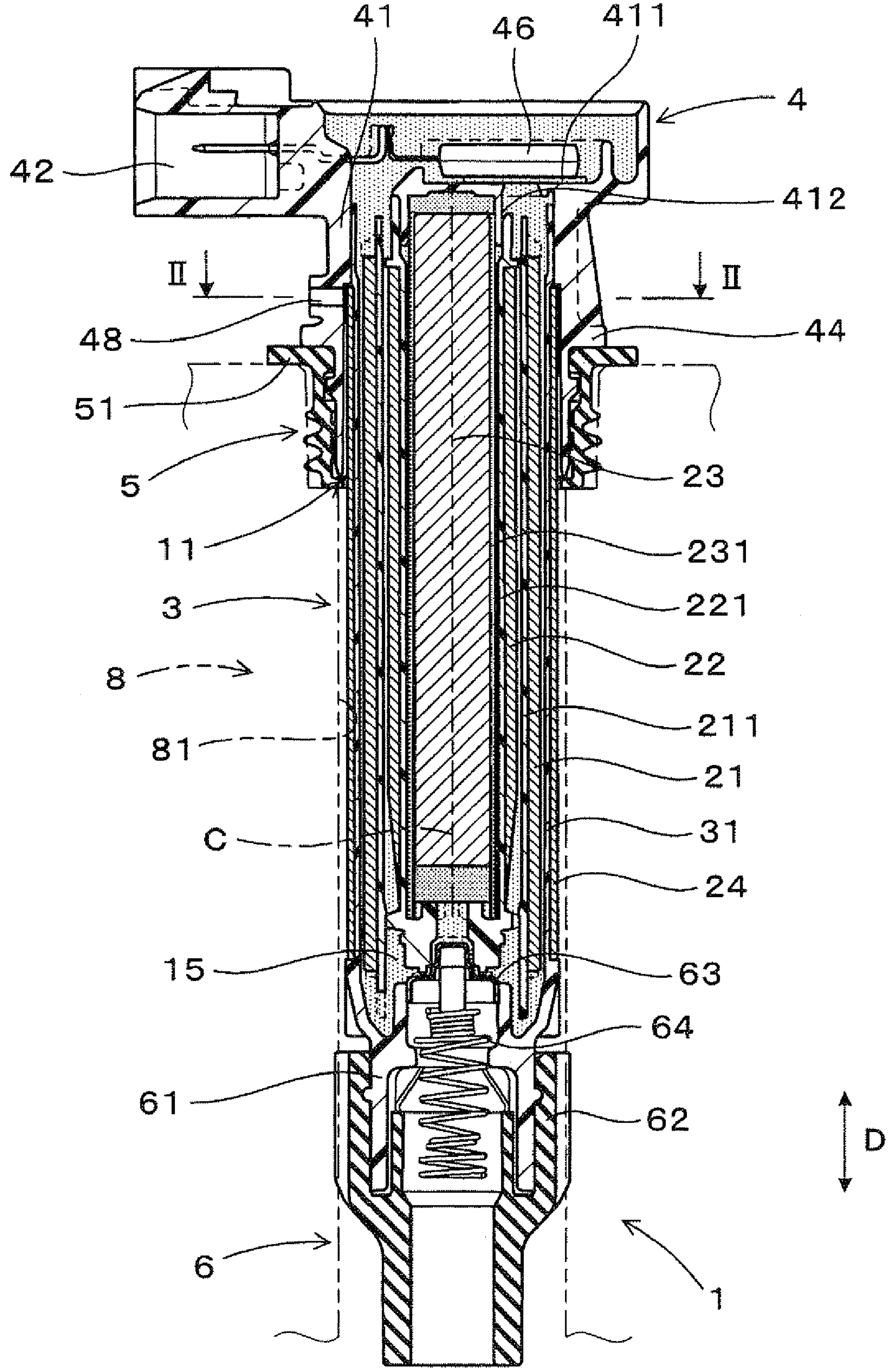
FIG. 1 is an explanatory sectional view illustrating an overall configuration of an ignition coil according to an embodiment of the invention.
Figure 2:
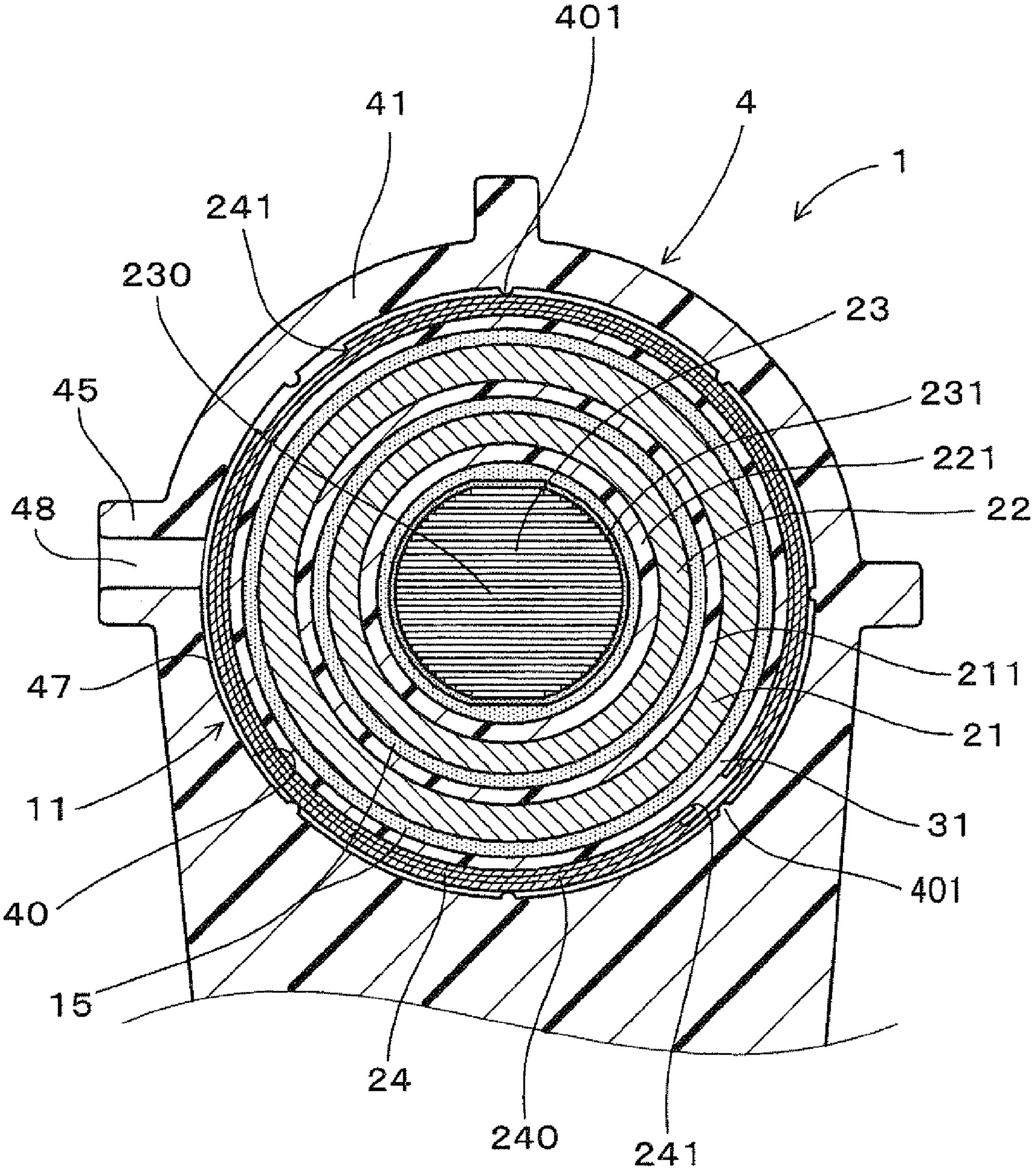
FIG. 2 is an explanatory cross-sectional view taken along a line II-II in FIG. 1.

The embodiment of an ignition coil of the invention is described below with reference to the accompanying drawings. As shown in FIGS. 1, 2, an ignition coil 1 of the present embodiment includes a coil part 3 and a connector case part 4 made of resin. The coil part 3 includes a primary coil 21 and a secondary coil 22, a soft magnetic center core 23 on an inner circumferential side of the primary coil 21 and the secondary coil 22 arranged in layers in an inner-outer circumferential direction, and a soft magnetic peripheral core 24 on an outer circumferential side of the primary coil 21 and the secondary coil 22. The connector case part 4 includes a connector area 42 to which an electric harness is connected. The ignition coil 1 is used with the coil part 3 inserted in a plug hole 81 formed in a cylinder head/cylinder head cover 8 of an engine, and with the connector case part 4 disposed outside the plug hole 81.

Figure 3:
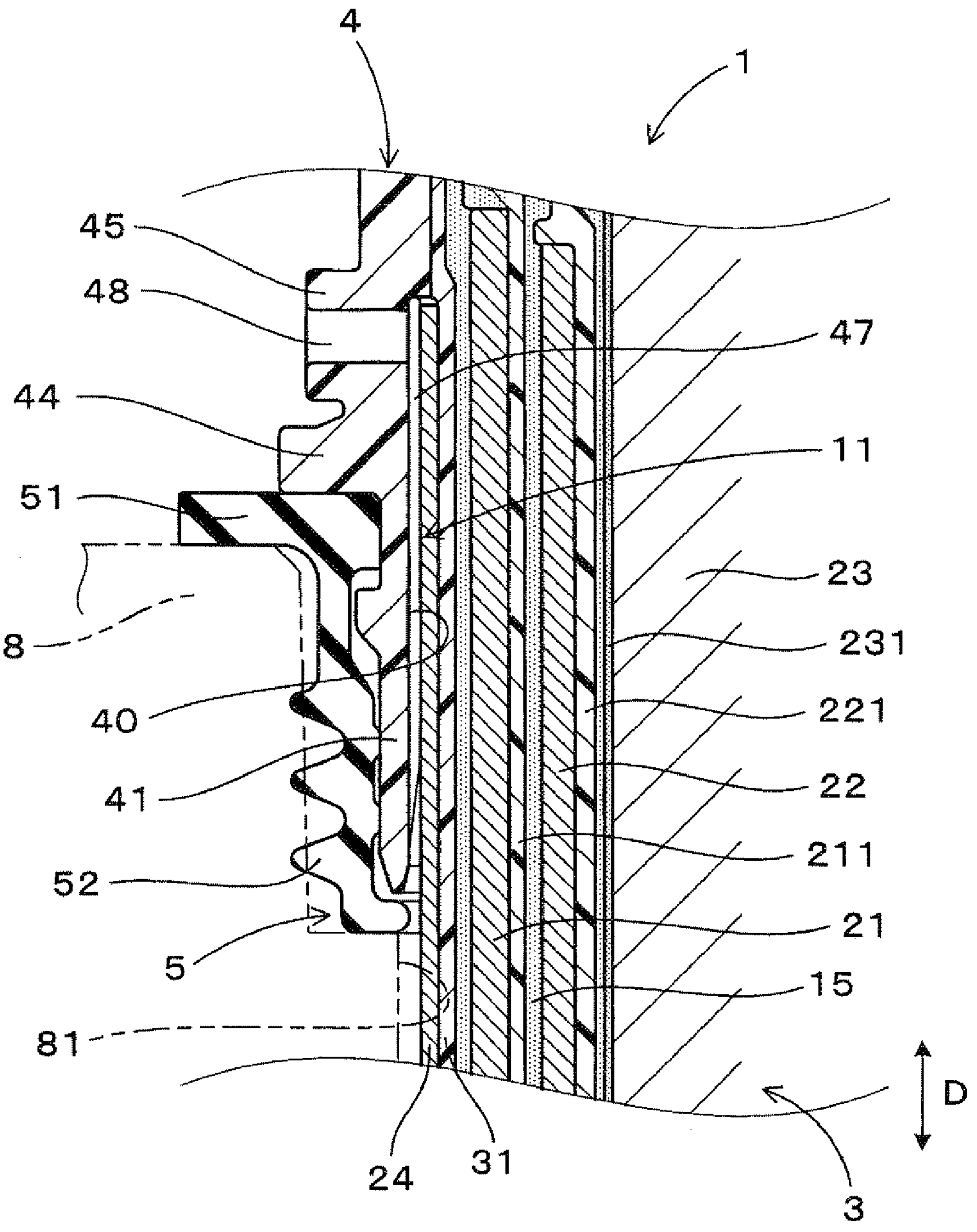
FIG. 3 is an enlarged explanatory sectional view illustrating a part of the ignition coil according to the embodiment.

The ignition coil 1 of the present embodiment is assembled by inserting an axial upper end portion of the peripheral core 24 of the coil part 3 into an insertion hole 40 of the connector case part 4. An annular seal rubber 5 for sealing a gap between the connector case part 4 and the plug hole 81 is attached around an outer circumference of the connector case part 4. The seal rubber 5 is closely-attached to the plug hole 81, and the seal rubber 5 is closely-attached to the connector case parts 4 along the whole circumference of the coil part around an axis line C of the coil part 3. In the ignition coil 1 of the present embodiment, as shown in FIG. 3, a ventilation passage 11 for ventilating the plug hole 81 includes a ventilation clearance 47 formed between an inner wall surface of the insertion hole 40 and an outer wall surface of the peripheral core 24, and a ventilation hole 48 formed in the connector case part 4 in a position away from the seal rubber 5 to communicate with the ventilation clearance 47. In FIGS. 1, 3, an arrow D indicates the axial direction of the coil part 3.

The ignition coil 1 of the present embodiment is described in detail below with reference to FIGS. 1 to 3. As shown in FIG. 1, the ignition coil 1 of the present embodiment is used with the coil part 3 inserted in the plug hole 81 of the cylinder head/cylinder head cover 8 downward (or obliquely downward) in a vertical direction, and with the connector case part 4 located above (or obliquely upward on) the cylinder head cover 8. The axial upper end portion is located on an upper side (or obliquely upward) in the vertical direction, and an axial lower end portion is located on a lower side (or obliquely downward) in the vertical direction.

The coil part 3 of the present embodiment is assembled by receiving the primary coil 21, the secondary coil 22, and the center core 23 in a coil case 31 made of cylindrically-shaped resin. The peripheral core 24 is attached around the coil case 31. The secondary coil 22 is inserted and passes on an inner circumferential side of the primary coil 21, and the center core 23 is inserted and passes on an inner circumferential side of the secondary coil 22. The ignition coil 1 is used by attaching itself to an insulator part of a spark plug (not shown) screwed at the bottom of the plug hole 81 of the cylinder head 8.

The primary coil 21 is formed as a result of winding a primary winding having an insulating coating thereon around an outer circumference of a primary spool 211 made of resin having a circular ring-shaped cross section. The secondary coil 22 is formed as a result of winding a secondary winding having an insulating coating thereon around an outer circumference of a secondary spool 221 made of resin having a circular ring-shaped cross section. The secondary winding has a smaller diameter than the primary winding, and the secondary winding is wound more times around the secondary spool 221 than the primary winding is wound around the primary spool 211.

As shown in FIG. 2, the center core 23 of the present embodiment is formed as a result of stacking tabular magnetic steel sheets (e.g., silicon steel plate) 230 in a radial direction of the ignition coil 1 to have a generally circular cross section. The peripheral core 24 is formed as a result of stacking arc-shaped magnetic steel sheets (e.g., silicon steel plate) 240 in the radial direction along a shape of an outer circumferential surface of the coil case 31. Each of the magnetic steel sheets 240 which constitute the peripheral core 24 has a notch 241 formed over its overall length in the axial direction. The peripheral core 24 of the present embodiment is formed such that a formation position of the notches 241 of the two inner magnetic steel sheets 240 in a circumferential direction is shifted from a formation position of the notch 241 of the outermost magnetic steel sheet 240 in the circumferential direction. A stress-relaxation seat 231 made of PET (polyethylene terephthalate) and the like is wound around the outer circumference of the center core 23.

As shown in FIG. 1, the connector case part 4 of the present embodiment is formed such that the connector area 42 and an attaching flange portion for attaching the ignition coil 1 to the cylinder head cover 8 of the engine are formed to project toward radially outward from a cylindrically-shaped case main body portion 41 having the insertion hole 40. The insertion hole 40 penetrates through the case main body portion 41. An igniter 46 including a switching circuit for energizing the primary coil 21 is disposed on an upper-surface side of an igniter arranging part 411 in the insertion hole 40. An alignment part 412 for holding the axial upper end portion of the center core 23 is formed on a lower-surface side of the igniter arranging part 411. The center position arrangement of the center core 23 and the secondary coil 22 is done by the alignment part 412. The connector area 42 is electrically connected to an electronic control unit (ECU) of the engine via an electric wiring (wire harness). Conductive pins of the igniter 46 are conductive to a conductive pin that is insert-molded in the connector area 42.

As shown in FIG. 2, a projection portion 45 is formed on a side surface of the case main body portion 41 of the connector case part 4 of the present embodiment. The ventilation hole 48 of the present embodiment is formed along a projection direction of the projection portion 45, and opens on the projection portion 45 toward the outside. Projections 401 in contact with the outer circumferential surface of the peripheral core 24 are formed at a plurality of positions (three or more positions in the present embodiment) on the inner wall surface of the insertion hole 40 of the case main body portion 41 in a circumferential direction of the case main body portion 41. Clearances formed between the projections 401 at a plurality of positions in the circumferential direction serve as the ventilation clearance 47 of the present embodiment. The ventilation clearance 47 is formed between the inner wall surface of the insertion hole 40 and the outer circumferential surface of the peripheral core 24. The projections 401 of the present embodiment are formed in a long shape along the axis line C of the coil part 3. The ventilation clearances 47 of the present embodiment are formed as evenly as possible in the circumferential direction to have as large passage cross-sectional areas as possible in the circumferential direction. When the coil part 3 of the present embodiment is inserted into the insertion hole 40 of the connector case part 4, the outer circumferential surface of the peripheral core 24 slides on surfaces of the projections 401, and thereby the coil part 3 is smoothly inserted into the insertion hole 40.

As shown in FIG. 3, a case flange part 44 projecting radially outward along the whole circumference of the case main body portion 41 around the axis line C is formed around the case main body portion 41 of the connector case part 4. The case flange part 44 is closely-attached along its whole circumference to the rubber flanged portion 51 projecting radially outward along the whole circumference of the seal rubber 5. The projection portion 45, in which the ventilation hole 48 is formed, is formed on a side surface of the case main body portion 41 located on an upper side of the case flange part 44 in the axial direction. The seal rubber 5 has sealing ribs 52 inserted in an opening side end portion (upper end opening portion) of the plug hole 81 and arranged in the axial direction for sealing the gap between plug holes 81 and the connector case part 4.

As shown in FIG. 1, a plug attachment part 6 for attaching the coil part 3 to the spark plug is formed at an axial end (axial lower end portion) of the coil part 3, which is on the opposite side of the side on which the connector case part 4 is attached. The plug attachment part 6 includes a cylindrical base portion 61 made of resin that is connected with the coil case 31 (that is formed integrally with the axial lower end portion of the coil case 31 in the present embodiment), a cover-spark plug 62 made of rubber and attached to the cylindrical base portion 61 for inserting the insulator part of the spark plug, a high voltage terminal 63 conductive to a high voltage winding end part of the secondary coil 22, and a coil spring 64 conductive to the high voltage terminal 63. The high voltage terminal 63 is held between the axial lower end portion of the secondary spool and the cylindrical base portions 61. The coil spring 64 is formed so as not to be separated from the inside of the cover-spark plug 62. An axial lower end portion of the coil spring 64 is conductive to a terminal area formed at a leading end of the insulator part of the spark plug.

As shown in FIG. 1, a gap in the ignition coil 1 surrounded by the coil case 31, the connector case part 44, and the cylindrical base portion 61, is filled with thermosetting resin (e.g., epoxy resin) 15 for fixing and insulating the component parts (e.g., the primary coil 21, the secondary coil 22, and center core 23). The thermosetting resin 15 is formed in the following manner. Firstly, the inside of the above gap of the ignition coil 1 is vacuumized after the component parts of the ignition coil 1 are assembled. Then, after filling the gap in the vacuum state with the thermosetting resin 15 in a liquid condition, the thermosetting resin 15 is hardened.

In the ignition coil 1 of the present embodiment, when the primary coil 21 is energized by the switching circuit of the igniter 46 in response to a command from the ECU, a magnetic field passing through the center core 23 and the peripheral core 24 is formed. Then, when the energization of the primary coil 21 is cut off, a voltage is generated in the primary coil 21 due to a self-inductance effect, and high-voltage induced electromotive force is generated in the secondary coil 22 due to a mutual induction effect. As a result, a spark is generated between the pair of electrodes in the spark plug attached to the ignition coil 1.

In the ignition coil 1 of the present embodiment, which is a certain type of the ignition coil 1, in which the coil part 3 is inserted into the insertion hole 40 of the connector case part 4, an effect of preventing water or the like from entering into the plug hole 81 is improved by a simple device. More specifically, the ventilation clearance 47 is formed between the inner wall surface of the insertion hole 40 of the connector case part 4 and the outer wall surfaces of the peripheral core 24. As a result of the communication of the ventilation hole 48 formed in the connector case part 4 with the ventilation clearance 47, the ventilation passage 11 for ventilating the plug hole 81 is formed. Thus, in the present embodiment, the ventilation clearance 47 is easily formed using the insertion hole 40 and the peripheral core 24.

Gas (e.g., ozone gas due to the high voltage) in the plug hole 81 flows from the ventilation clearance 47 of the ventilation passage 11 into the ventilation hole 48. Accordingly, the gas is discharged into the outside of the plug hole 81 through the ventilation hole 48. The plug hole 81 has a negative pressure in a process, in which the engine is cooled from a state in which the engine is warmed up after combusting fuel in the engine using the ignition coil 1. Meanwhile, although the periphery of the seal rubber 5 arranged in the plug hole 81 is in a state in which water or the like is easily accumulated, the seal rubber 5 is closely-attached to the plug hole 81, and the seal rubber 5 is closely-attached to the case main body portions 41 of the connector case part 4 along the whole circumference of the case main body portions 41 around the axis line C of the coil part 3. Consequently, water or the like is effectively prevented from entering into the plug hole 81.

The ventilation hole 48 of the ventilation passage 11 of the present example opens to the outside on the projection portion 45 formed on the side surface of the case main body portion 41. The projection portion 45 is formed on a side surface of the case main body portion 41 located on an upper side of the case flange part 44 in the axial direction. Accordingly, even when water or the like remains around the periphery of an area in which the case flange part 44 is closely-attached to the rubber flanged portion 51, it is difficult for the water to enter into the ventilation hole 48.

Therefore, according to the ignition coil 1 of the present embodiment, the ventilation passage 11 for effectively preventing water or the like from entering into the plug hole 81 is formed using a simple structure.

In the present embodiment, the ventilation clearance 47 is formed between the projections 401 formed on the inner wall surface of the insertion hole 40 of the case main body portion 41 and the outer circumferential surface of the peripheral core 24. Alternatively, the ventilation clearance 47 may be formed as follows. For example, although a corresponding drawing is left out, the ventilation clearance 47 may be formed between groove portions formed on the inner wall surface of the insertion hole 40 and the outer circumferential surfaces of the peripheral core 24. Also, the ventilation clearance 47 may be formed between the inner wall surface of the insertion hole 40 and the notch 241 formed over the overall length of the peripheral core 24 in its axial direction.

Additional advantages and modifications will readily occur to those skilled in the art. The invention in its broader terms is therefore not limited to the specific details, representative apparatus, and illustrative examples shown and described.

What is claimed is:

1. An ignition coil inserted in a plug hole of an engine, the ignition coil comprising:

a coil part including a primary coil, a secondary coil, a soft magnetic center core, and a soft magnetic peripheral core, wherein:

the primary coil and the secondary coil are disposed in layers generally coaxially with each other;

the center core is disposed on an inner circumferential side of the primary coil and the secondary coil; and the peripheral core is disposed on an outer circumferential side of the primary coil and the secondary coil;

a connector case part made of resin and having a connector area, to which an electric wiring is connected, wherein:

the coil part is inserted in the plug hole of the engine, and the connector case part is disposed outside the plug hole;

an axial end portion of the peripheral core of the coil part is inserted in an insertion hole of the connector case part; and the peripheral core and an inner wall surface of the insertion hole define a ventilation clearance therebetween;

an annular seal rubber attached to an outer circumference of the connector case part, wherein:

a gap between the connector case part and the plug hole is sealed with the seal rubber; and the seal rubber is closely-attached to the plug hole and the connector case part along a whole circumference of the seal rubber around a central axis of the coil part; and a ventilation passage including the ventilation clearance and a ventilation hole that is formed at a certain position of the connector case part away from the seal rubber to communicate with the ventilation clearance and to communicate with an outside of the connector case part, wherein the plug hole is ventilated to the outside of the connector case part through the ventilation passage.

2. The ignition coil according to claim 1, wherein:

the connector case part has a plurality of projections on the inner wall surface of the insertion hole of the connector case part in a circumferential direction of the insertion hole;

the plurality of projections is in contact with an outer circumferential surface of the peripheral core; and the ventilation clearance is formed between the inner wall surface of the insertion hole and the outer circumferential surface of the peripheral core.

3. The ignition coil according to claim 1, wherein:

the peripheral core has a notch, which is formed along an entire length of the peripheral core in an axial direction of the peripheral core; and the ventilation clearance is formed between the inner wall surface of the insertion hole and the notch of the peripheral core.

4. The ignition coil according to claim 1, wherein:

the connector case part has a projection portion that projects from a side surface of the connector case part; and the ventilation hole opens to the outside through the projection portion.

5. The ignition coil according to claim 1, wherein:

the connector case part has a case flange part, which projects in a radially outward direction, along a whole circumference of the connector case part around the central axis;

the seal rubber has a rubber flanged portion that projects in a radially outward direction along a whole circumference of the seal rubber; and the case flange part is closely-attached to the rubber flanged portion along a whole circumference of the case flange part.

* * * * *